(12) United States Patent
Rogers et al.

(10) Patent No.: US 7,891,866 B2
(45) Date of Patent: Feb. 22, 2011

(54) EMISSIVITY INDEPENDENT NON-CONTACT HIGH TEMPERATURE MEASUREMENT SYSTEM AND METHOD

(75) Inventors: Mark D. Rogers, Ballwin, MO (US); Loyal B. Shawgo, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 350 days.

(21) Appl. No.: 12/032,893

(22) Filed: Feb. 18, 2008

(65) Prior Publication Data

US 2009/0210191 A1 Aug. 20, 2009

(51) Int. Cl.
G01K 1/16 (2006.01)
G01J 5/00 (2006.01)

(52) U.S. Cl. .......... 374/120; 374/127; 374/128; 702/134

(58) Field of Classification Search ............ 374/120, 374/127, 128; 702/134
See application file for complete search history.

(56) References Cited

U.S. PATENT DOCUMENTS

| 5,561,523 | A | 10/1996 | Blomberg et al. | |
|---|---|---|---|---|
| 7,744,274 | B1 * | 6/2010 | Grek et al. | 374/124 |
| 2002/0146056 | A1 * | 10/2002 | Yano et al. | 374/127 |
| 2009/0296776 | A1 * | 12/2009 | Riza et al. | 374/130 |

OTHER PUBLICATIONS

Nogueira, Felipe G.; Felps, Daniel; and Gutierrez-Osuna, Ricardo. "Development of an Infrared Absorption Spectroscope Based on Linear Variable Filters", IEEE Sensors Journal, vol. 7, No. 8, Aug. 2007, pp. 1183-1190.

Madura, H.; Piatkowski, M. Kastek. "Automatic Compensation of Emissivity in Three-Wavelength Pyrometers", Institute of Optoelectronics, Military University of Technology, Infrared Physics & Technology 51 (2007) pp. 1-8.

Byer, R. L. and Roundy, C. B. "Pyroelectric Coefficient Direct Measurement Technique and Application to a Nsec Response Time Detector", Microwave Laboratory, Stanford University, Stanford, California, IEEE Trans. Sonics & Ultrasounds, 1972, SU-19, pp. 333-338.

* cited by examiner

Primary Examiner—Lisa M Caputo
Assistant Examiner—Mirellys Jagan
(74) Attorney, Agent, or Firm—Harness, Dickey & Pierce, P.L.C.

(57) ABSTRACT

A system and method for determining the temperature of an object without physically contacting the object. The method involves reading a spectral radiation of the object over a plurality of wavelengths to obtain a set of radiation data related to a temperature of the object. A known characteristic of a black body is determined at a plurality of predetermined, different test temperatures. The spectral data and the characteristic of the black body at the various test temperatures are used to calculate a temperature of the object.

11 Claims, 4 Drawing Sheets

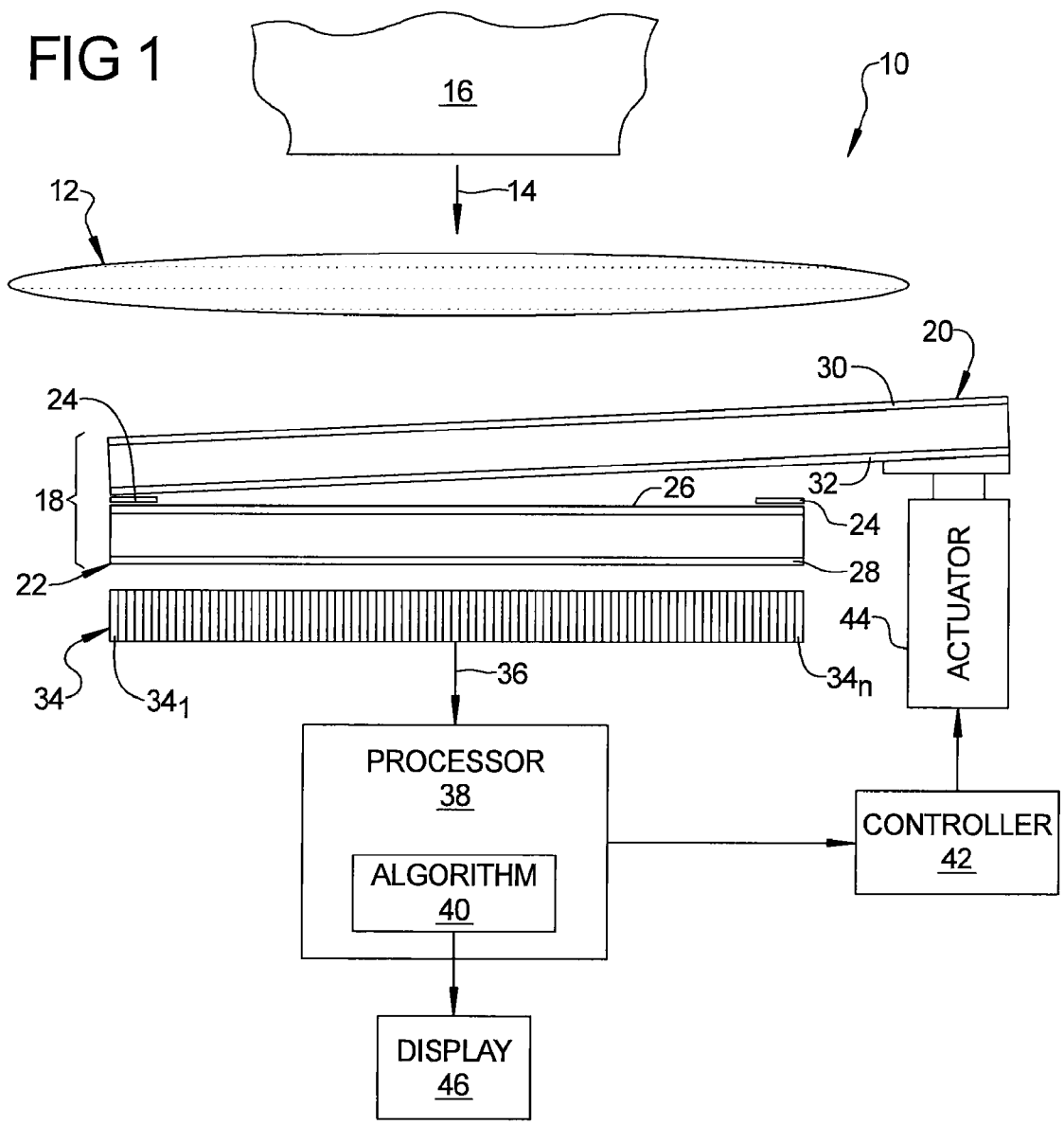
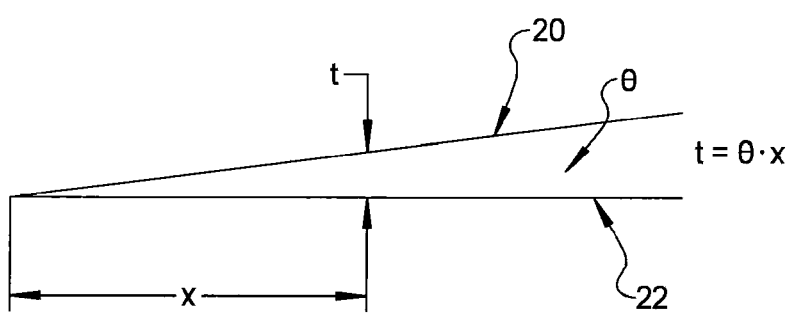

EMISSIVITY INDEPENDENT NON-CONTACT HIGH TEMPERATURE MEASUREMENT SYSTEM AND METHOD

FIELD

The present disclosure relates to temperature measurement systems and methods, and more particularly to a spectral radiometer system and method that is able to determine a temperature of a high temperature object without making physical contact with the object.

BACKGROUND

The statements in this section merely provide background information related to the present disclosure and may not constitute prior art.

Various system and methods have been employed where the need has existed to determine the temperature of object. Such systems and methods have typically involved the use of optical pyrometers, laser assisted pyrometers, multi-spectral pyrometers and thermocouples. In the case of thermocouples, there has been a need to make physical contact with a portion of the object whose temperature is being sensed. This is less desirable since it can affect the measurement by way of the physical contact. Pyrometers, on the other hand, do not involve physical contact of the sensor with the object whose temperature is being sensed. However multi-spectral pyrometers tend to be complex in construction.

SUMMARY

The present disclosure relates to an apparatus and method for determining a temperature of an object without the need to physically contact the object, and which has a straightforward implementation. In one implementation a method is provided that involves reading a spectral radiation of the object over a plurality of wavelengths to obtain a set of radiation data related to a temperature of the object. A known characteristic of a black body is determined at a plurality of test temperatures. The characteristic is used at each of the test temperatures, along with the set of radiation data, to determine a temperature of the object.

In one particular implementation the method involves determining the temperature of an object without physically contacting the object. First a reading of the spectral radiation of the object over a plurality of wavelengths is taken to obtain a set of radiation data related to a temperature of the object. A characteristic of the black body is then determined at a plurality of test temperatures. The characteristic is then analyzed, at each of the test temperatures, relative to the set of obtained radiation data, to generate a set of ratios, one set for each test temperature. Thus, each set of ratios is uniquely associated with a respective one of the test temperatures. A standard deviation is then determined for each set of ratios, to thus create an array of standard deviations. The minimum standard deviation is selected from the array of standard deviations. The minimum standard deviation serves to identify that specific set of ratios that deviates the least from the characteristic of the black body at a specific test temperature. Using the minimum standard deviation, the specific test temperature associated with the set of ratios that produced the minimum standard deviation may be deduced, and subsequently used to calculate an actual temperature of the object.

Thus, by using a known characteristic of a black body at a plurality of different test temperatures, and by analyzing the ratios created when comparing the spectral data obtained with the black body characteristic at a plurality of different known test temperatures, the actual temperature of the object can be obtained without any physical contact with the object. A particular advantage is that by using the known characteristic of a black body, in connection with the analysis of the ratios obtained, the system and method is not affected by (nor does it require knowledge of) the emissivity of the object whose temperature is being measured.

In one form the apparatus includes an etalon filter, and in one specific implementation a Fabry-Perot filter combined with a linear variable filter. The filter receives spectral radiation from the object whose temperature is to be determined. The filter has a pair of optical elements, one of which may have its angular position adjusted relative to the other, to sweep an optical signal across a linear array detector arranged adjacent an output side of the linear variable filter. The output of the linear array detector is analyzed by a processor using an algorithm that creates the sets of ratios and the array of standard deviations described above. The processor and the algorithm determine, from the minimum standard deviation, the specific test temperature associated with the ratio set that produced the minimum standard deviation. The processor and the algorithm use this information to then calculate the actual temperature of the object.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a high level block diagram of one embodiment of an apparatus in accordance with the present disclosure for determining the temperature of an object without physically contacting the object;

FIG. 2 is a prior art diagram that helps to explain the nature of the output of an etalon filter;

DETAILED DESCRIPTION

Figure 4:
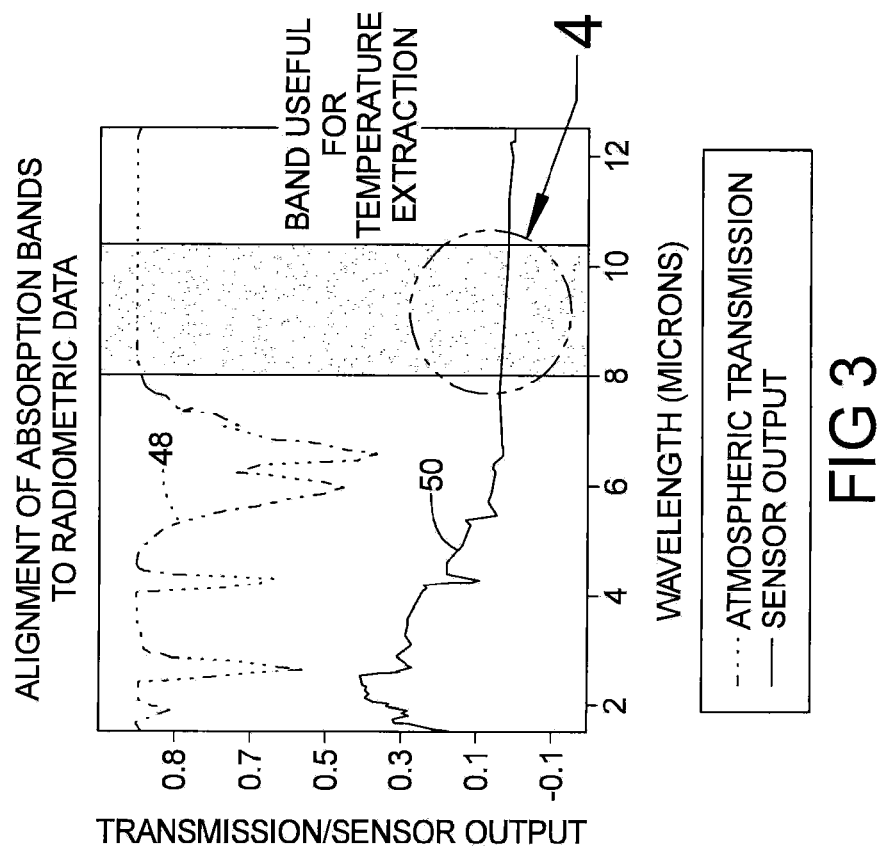
FIG. 4 is an enlarged view of a portion of the output waveform shown in FIG. 3 as well as a characteristic (in this example radiance) of an ideal black body.

The following description is merely exemplary in nature and is not intended to limit the present disclosure, application, or uses.

Referring to FIG. 1, there is shown an apparatus 10 in accordance with one embodiment of the present disclosure. The apparatus 10 includes a lens 12 that receives spectral radiation 14 from an object 16. The apparatus 10 is not in contact with the object 16 whose temperature is being measured. The lens 12 may be an anamorphic lens. The spectral radiation 14 is focused by the lens 12 onto an etalon filter, in this example a Fabry-Perot filter combined with a linear variable filter 18. For convenience, the filter 18 will be referred to simply as the "etalon filter" 18.

The etalon filter 18 includes a first substrate 20 and a second substrate 22 that is spaced apart from the first substrate. Spacer elements 24 may be positioned between the substrates 20 and 22 to maintain a minimum spacing, and thus limit to set the minimum wavelength that may be transmitted by the etalon filter 18. The second substrate 22 may include a broad band reflective coating 26 on a first thereof that faces the lens 12. A second (i.e., opposite) surface of the second substrate may include a linear variable transmitting filter 28. The wavelength of the linear variable transmitting filter 28 may be set to any desired range for a specific application.

The first substrate 20 may include a broad band anti-reflective coating 30 on a first surface thereof that faces the lens 12, and a broad band reflective coating 32 on a second (i.e., opposing) surface thereof. Substrates 20 and 22 may be comprised of a material that transmits the set of wavelengths that are received at the linear array detector 34. Examples of suitable materials are Germanium, Zinc, Selenide, and Sapphire. Each may have a thickness typically within a range of about 0.125_inch-0.25 inch (3.175 mm-6.35 mm).

A linear array detector 34 is disposed adjacent the etalon filter 18 to receive spectral information being output from the etalon filter. The detector 34 includes a plurality of independent detector segments $34_1$-$34_n$ that each are tuned to a specific wavelength. Each detector segment $34_a$-$34_n$ generates an electrical output signal in relation to the energy of the spectral radiation that impinges it. The detector 34 output signals are denoted in simplified form by reference number 36. In one specific form the linear array detector 34 forms a linear array of pyroelectric type sensors.

The electrical output signals 36 from the detector 34 are fed to a processor 38 that is adapted to execute an algorithm 40. The processor 38 generates output signals that may be used by a controller 42 to control an actuator 44, such that operation of the actuator 44 is synchronized to the output of the linear array detector 34. When the processor 38 receives a synchronizing pulse from the linear array detector 34 within the output signals 36, it transmits the signal 41 to the controller 42. The controller 42 applies a swept voltage, linear in time, to the actuator 44 which responds by changing the angle that the substrate 20 makes with respect to substrate 22. The angle is also changed in a linear fashion with time, after which the controller 42 resets the actuator 44 to its initial position, thereby resetting the substrate 20 to its initial angle of zero degrees. The synchronization of the actuator 44 comes about from signals that are internally generated by the array detector 34 that are sequentially sent to the processor 38 at a rate of preferably about ten times per second or greater. Thus, movement of the first substrate 20 effectively causes the focused spectral radiation from the lens 12 to be "swept" across the surface of the detector 34 that faces the etalon filter 18.

The algorithm 40 is used by the processor 38 to analyze known, predetermined characteristics of a black body, at various test temperatures, in relation to the spectral data provided by the linear array detector 34. This will be explained in greater detail in the following paragraphs, but in brief the algorithm 40 operates to obtain a set of ratios at each one of the test temperatures, and to generate an array of standard deviations therefrom. A minimum one of the standard deviations is identified. The minimum standard deviation identifies the set of ratios that varied the least from its associated test temperature. From this information the actual temperature of the object 16 can be determined. The actual temperature may then be displayed on a display device 46 such as an LCD display, a CRT display, or otherwise printed using a printer (not shown) or stored using a memory device (not shown)

Referring briefly to FIG. 2, background information on the characteristics of the linear variable transmitting filter 28 will now be discussed. One may assume that for a given wavelength, the transmission from the filter 28 will be a Gaussian shape, with $\sigma=0.1$ micron.

Also assume center or average wavelength, $\lambda$, is proportional to the "x" position. Thus, the output of the linear variable transmitting filter 28 may be expressed as:

$$T_{IVF}(x) = e^{\frac{-(x-\lambda)^2}{2\sigma^2}}$$

The transmission of the etalon filter 18 "T" also varies across the aperture of the first (i.e., tilted) substrate 20 as a function of tilt angle, wavelength, I, and Reflectance, R. Thus, the transmission function for the etalon filter 18 with a spacing of t is, for normal incidence, $$T_{etalon} = \frac{1}{1 + F \cdot \sin^2\left(\frac{\delta}{2}\right)}$$

where $$F = \frac{4R}{(1-R)^2}$$

and $$\delta = \frac{4 \cdot t}{\lambda}$$

The spacing "t" used in the transmission function varies across the length of the etalon plate "x" and depends upon the tilt or wedge angle "q" for small angles as represented in FIG. 2. Higher orders of etalon transmission, for example where $\lambda$ desired=10 micron, and $\lambda$=5 micron is also transmitted, are rejected by the linear variable filter transmission function.

For a given tilt angle "$\theta$", the total transmission of both filter elements (i.e., substrates 20 and 22) is given as a function of x and $\lambda$ by:

$$T_{total}(x, \lambda) = e^{\frac{-(x-\lambda)}{2\sigma^2}} \cdot \left[1 + F \cdot \sin^2\left(\frac{4 \cdot \theta \cdot x}{\lambda}\right)\right]^{-1}$$

In general, the algorithm 40 may be used to find the minimum difference between a set of test functions and the measured data (represented by output 36) obtained from the linear array detector 34. The main assumption about the data is that it has been acquired from a source with constant emissivity (a gray body). For an ideal gray body source, the ratio of an ideal black body ($I_{BB}$) to the measured gray body characteristic ($I_{data}$), at the same temperature, will be a constant:

$$\frac{I_{BB}(\lambda)|_{T1}}{I_{data}(\lambda)|_{T2}} = R(\lambda) = \text{constant when } T1 = T2$$

where T1=temperature 1=T2=temperature 2.

In the case where T1=T2, R ($\lambda$)=constant=1/emissivity for all $\lambda$. In this case, the standard deviation taken over the set of ratios taken across the measurement band is zero, since σ (the constant)=0. For cases where T1 and T2 are different, the standard deviation is always greater than zero.

The algorithm 40 compares the data set (i.e., collection of spectral output signals from the detector 34) to the black body characteristics at incremental test temperatures and computes an array of standard deviations from the resulting curves. The minimum standard deviation of this array occurs at the test temperature closest to that corresponding to the spectral output data 36.

Figure 3:
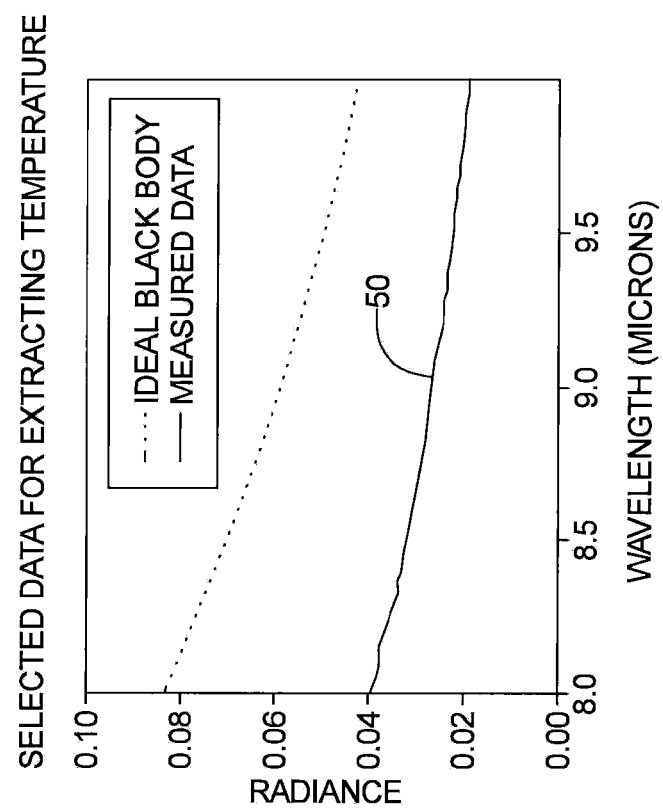
FIG. 3 is a graph showing an exemplary spectral radiation input signal and an exemplary output from the etalon filter of FIG. 2.

Absorption mechanisms such as atmospheric $C_{O2}$ and water vapor, however, can cause the resulting spectral data set to deviate considerably from the ideal gray body characteristic. This is illustrated in FIG. 3, where atmospheric transmission 48 is represented in dashed lines and represents the spectral signal 14 from the object 16, and the solid line graph 50 represents the output of the linear array detector 34. To circumvent this drawback, only data in wavelength bands outside the known absorption regions need be considered to get accurate results. In this example, the wavelength bands of graph 50 indicated by circled area 4 may be used, because at these wavelengths the portions of the graphs 48 and 50 are substantially unaffected by the atmospheric absorption. Because of this, an accurate measurement may be had by using only a portion of the available data set, if absorption or other perturbing processes are present. FIG. 4 illustrates the circled portion of graph 50 from FIG. 3, together with the radiance of an ideal black body at various wavelengths over the wavelength spectrum between from 8 microns to about 10.2 microns. These curves are substantially unaffected by atmospheric absorption, meaning that no significant ambient influences will affect the computation of the temperature of the object 16 in this wavelength region of interest.

Figure 5:
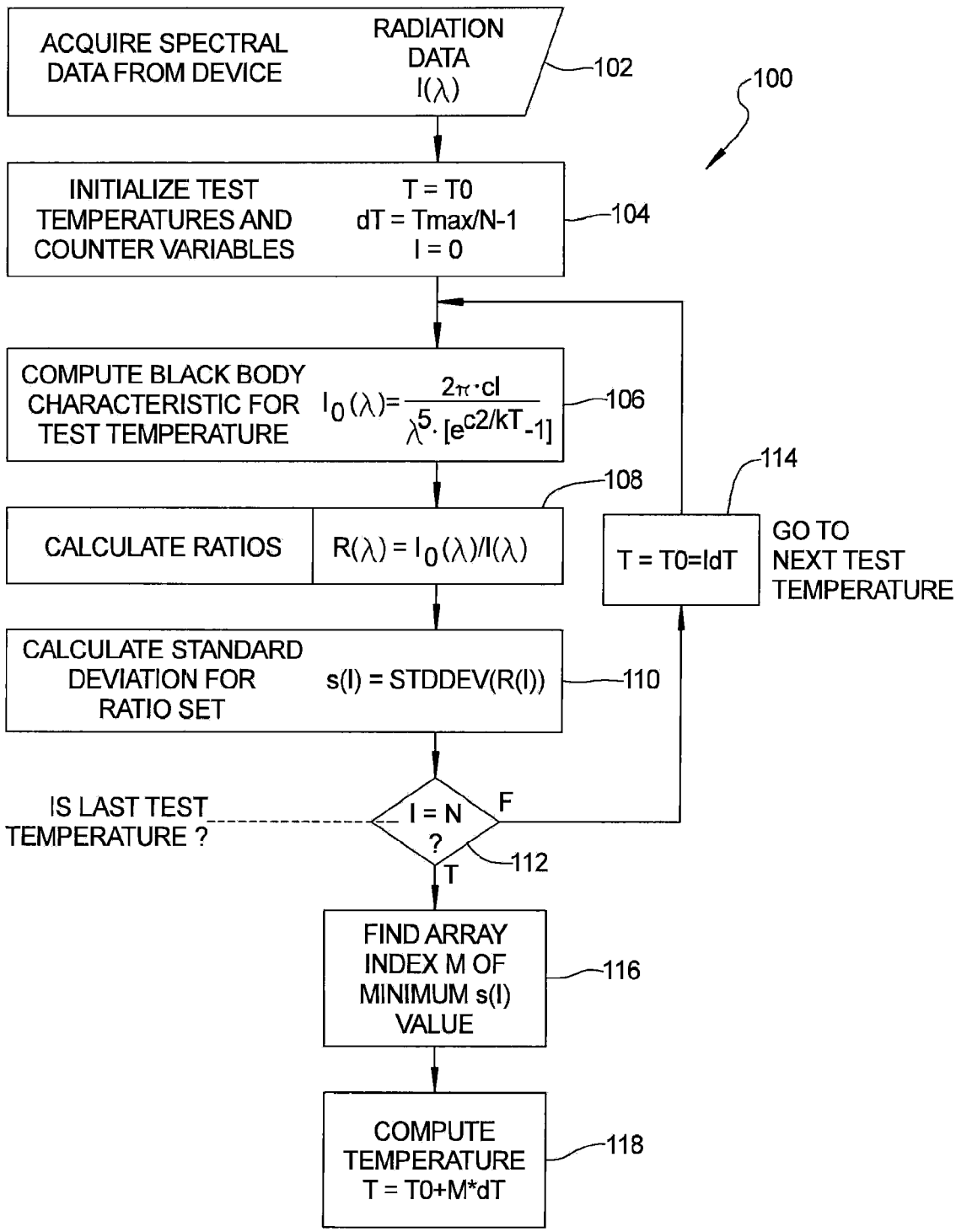
FIG. 5 is a flowchart illustrating operations performed by the apparatus of FIG. 2, and more particularly the operations performed by the processor of FIG. 2 using an algorithm, that enables the processor to analyze the spectral data collected against the test temperatures.

With the foregoing overview of the algorithm 40, reference will now be made to FIG. 5 for a more detailed discussion of the sequence of operations performed by the algorithm. Referring to the flowchart 100 of FIG. 5, which represents the operations of one implementation of the algorithm 40, at operation 102 the spectral radiation data from the object 16 is obtained using the apparatus 10 shown in FIG. 1. More specifically, the output 36 from the linear array detector 34 is obtained by the processor 38, which represents a set of spectral data taken at the different wavelengths of the individual detector segments $34_1$-$34_n$ of the detector. At operation 104, the test temperatures and a counter are initialized. The term "T=T0" indicates that the initial test temperature is set equal to zero. The term dT=Tmax/N-1 indicates that first test temperature used will be the maximum (highest) test temperature divided by "N-1", where "N" is the total number of test temperatures to be used by the algorithm 40. The term "I=0" sets a counter to zero.

At operation 106, the characteristic of an ideal black body, at a given wavelength, is calculated for the first test temperature. At operation 108, the algorithm 40 calculates a set of ratios for the first test temperature. This set of ratios is formed by using the outputs from the various segments $34_1$-$34_n$ of the detector 34, along with the characteristic calculated for the ideal black body (for example radiance) at the selected test temperature. Thus, this initial set of ratios is uniquely identified with the initial test temperature.

At operation 110, the standard deviation for the ratios just calculated at operation 108 is determined. A check is then made if the just used test temperature is the last temperature to be used, as indicated at operation 112, and if not, then the next test temperature is obtained as indicated at operation 114 and operations 106-112 are repeated. For example, the first test temperature used may be 300° C., the next one may be 400° C., and so forth.

Each cycle through operations 106-114 creates a set of ratios, with an associated standard deviation, that are both uniquely associated with a specific test temperature. Thus, the repeating of operations 106-114 creates an array of standard deviations, with each standard deviation being uniquely associated with a specific set of ratios, which in turn relate to only one of the test temperatures. Each standard deviation essentially represents the variation of the spectral data from the characteristic of the black body at a specific test temperature.

When the check at operation 112 indicates that there are no additional test temperatures to use, then the array of standard deviations is searched to determine the minimum standard deviation, as indicated at operation 116. The minimum standard deviation identifies the set of ratios, for a specific test temperature, that deviate the least from the characteristic of the black body at the same test temperature. At operation 118, the minimum standard deviation is used together with the minimum test temperature to compute the temperature of the object 16 (FIG. 1). The array index, "M", is determined from the set of standard deviations as follows. M is assigned to the index of the first element, i.e. M=1. Each element in the array of standard deviations, beginning with the first, is compared with the previous element. If that element is less than the previous element, then the array index of the lesser element is assigned to M. This process is repeated until all the indices are exhausted. The resulting value for M is the index of the minimum standard deviation element.

Figure 6:
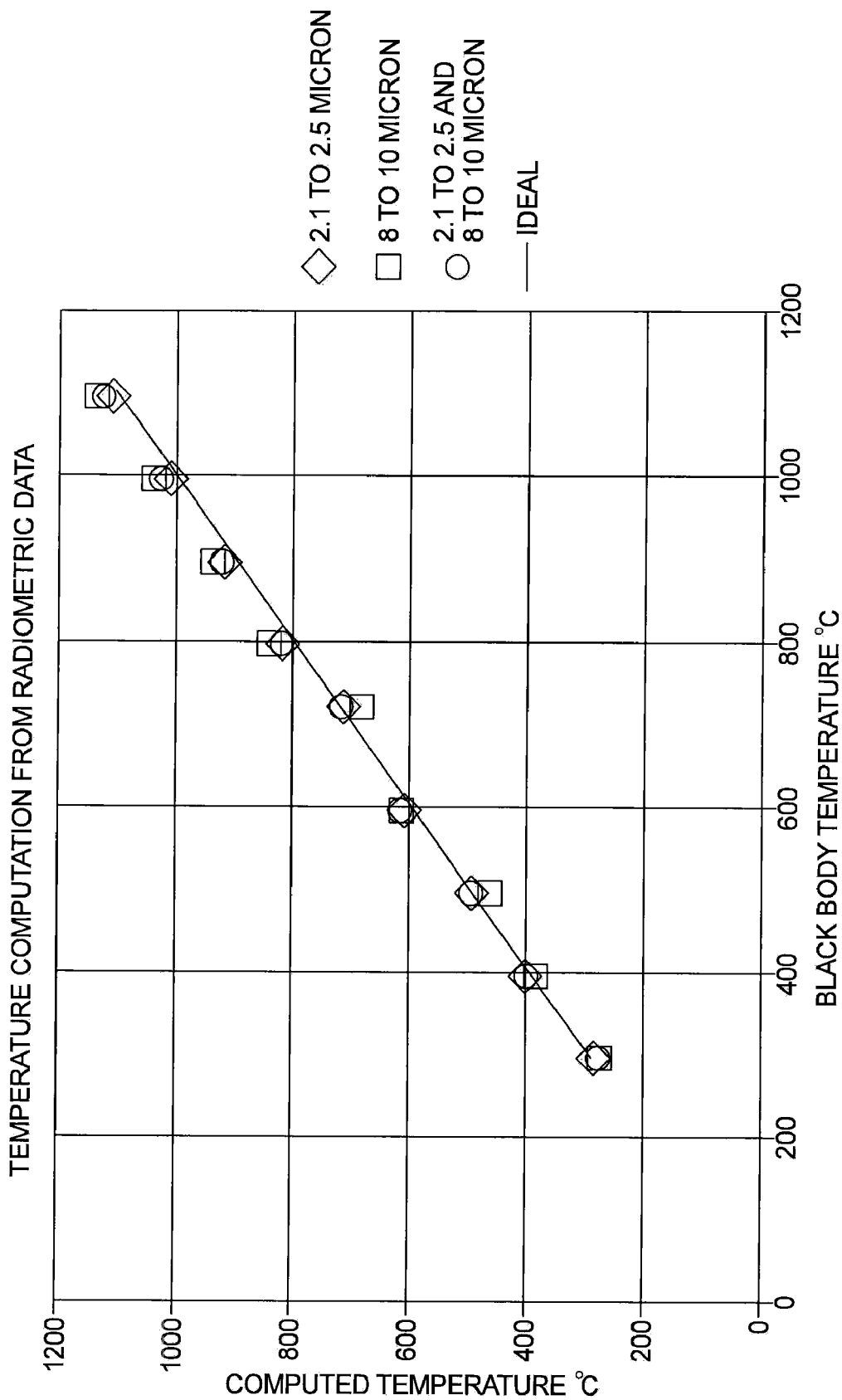
FIG. 6 is graph illustrating test results showing the accuracy of the apparatus and method in computing the temperature of a black body object.

Referring briefly to FIG. 6, a comparison of a computed temperature of a black body to its ideal temperature, using the apparatus 10 and methodology described herein, is shown. The In this example it can be seen that the computed temperatures at each of the frequency spectra 2.1-2.5 microns, 8-10 microns, and 2.1-2.5 and 8-10 microns all closely track the "ideal" (i.e., actual) temperature of the black body.

The apparatus 10 and method of the present disclosure may be used to measure the temperature of an object over a wide temperature range, and over 1200° C. The apparatus 10 is relatively compact, does not require an active laser source, and is able to operate on a broad range of materials that do not exhibit strong wavelength dependent surface emissivity. Moreover, the apparatus 10 does not require a mechanical light chopper, and performs its temperature measurement without the need to make physical contact with the object being measured. Still further, the linear array detector 34 may be operated without the need for active cooling.

A particular advantage of the system and method of the present disclosure is that by using known characteristics of a black body, in connection with the analysis of the ratios obtained, the emissivity of the object becomes immaterial to the determination of its actual temperature. Put differently, the present system and method does not require advance knowledge of the emissivity of the object being measured, nor is the outcome of the measurement determination made by the present system and method affected by the emissivity of the object being measured.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for determining the temperature of an object without physically contacting the object, comprising:

reading a spectral radiation of the object over a plurality of wavelengths to obtain a set of radiation data related to a temperature of the object;

determining a known characteristic of a black body at a plurality of test temperatures;

generating a set of ratios of said characteristic of said black body to said radiation data, at each one of said plurality of test temperatures;

generating an array of standard deviations, with each one of said standard deviations of said array being associated with a specific one of said set of ratios; and using said set of ratios and said array of standard deviations to determine a temperature of the object.

2. The method of claim 1, wherein generating a set of ratios of said characteristic of said black body to said radiation data, at each one of a plurality of temperatures, comprises sequentially generating each said set of ratios for said black body characteristic at each one of said test temperatures.

3. The method of claim 1, wherein reading said spectral information over a plurality of wavelengths comprises selecting a frequency spectrum where ambient factors are not likely to significantly influence a reading of said spectral radiation being obtained.

4. The method of claim 1, wherein using said characteristic of a black body and said set of radiation data to determine a temperature of the object comprises searching all of said array of standard deviations to identify a minimum standard deviation within said array of standard deviation, and identifying said test temperature associated with said minimum standard deviation as a temperature of said object.

5. The method of claim 4, further comprising using said minimum standard of deviation and said test temperature associated therewith to calculate an actual temperature of said object.

6. A method for determining the temperature of an object without physically contacting the object, comprising:

reading a spectral radiation of the object over a plurality of wavelengths to obtain a set of radiation data related to a temperature of the object;

determining a characteristic of a black body at a plurality of test temperatures; and using said characteristic of a black body at each of the test temperatures, and said set of radiation data, to generate a set of ratios, each said set of ratios being uniquely associated with a respective one of said test temperatures;

determining a standard deviation for each said set of ratios, to thus create an array of standard deviations;

analyzing said array of standard deviations to identify a specific set of said ratios that deviate the least from its associated said test temperature, and using said specific set of ratios to identify a specific one of said test temperatures as correlating to said temperature of said object.

7. The method of claim 6, wherein generating said sets of ratios comprises sequentially generating said sets of ratios for each of said test temperatures, one said test temperature at a time.

8. The method of claim 6, wherein reading said spectral information over a plurality of wavelengths comprises selecting a frequency spectrum where ambient factors are not likely to significantly influence a reading of said spectral radiation being obtained.

9. The method of claim 6, further comprising using said minimum one of said standard deviations and its associated said test temperature to calculate an actual temperature of said object.

10. The method of claim 6, wherein using said standard deviations to identify a specific set of said ratios that deviate the least comprises identifying a minimum one of said standard deviations from said array of standard deviations.

11. The method of claim 10, wherein creating an array of standard deviations comprises sequentially determining said standard deviations for each said set of ratios.

* * * * *